March 9, 1971    J. R. SPRIGGS ET AL    3,568,414
CLEANING APPARATUS FOR FLUID FILTERS
Filed June 5, 1969    3 Sheets-Sheet 2

INVENTORS.
JOHN R. SPRIGGS
BERNARD A. MATTHYS
BY
Merchant & Gould
ATTORNEYS

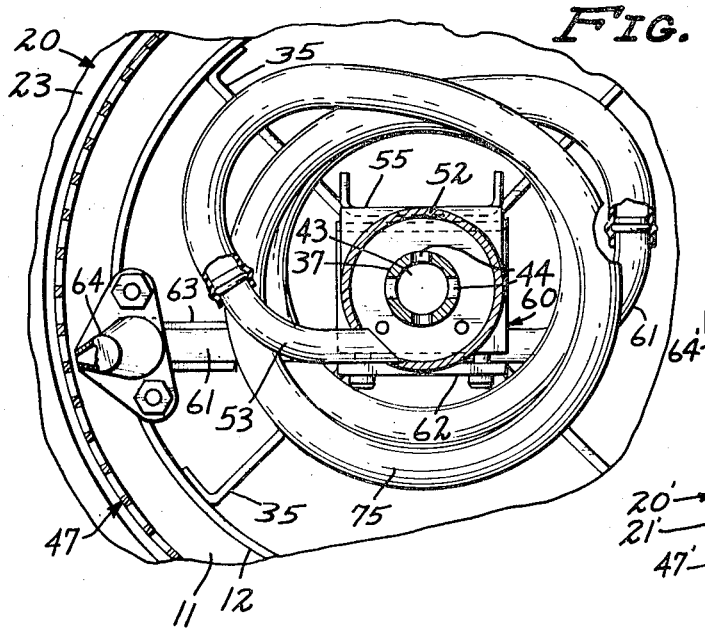
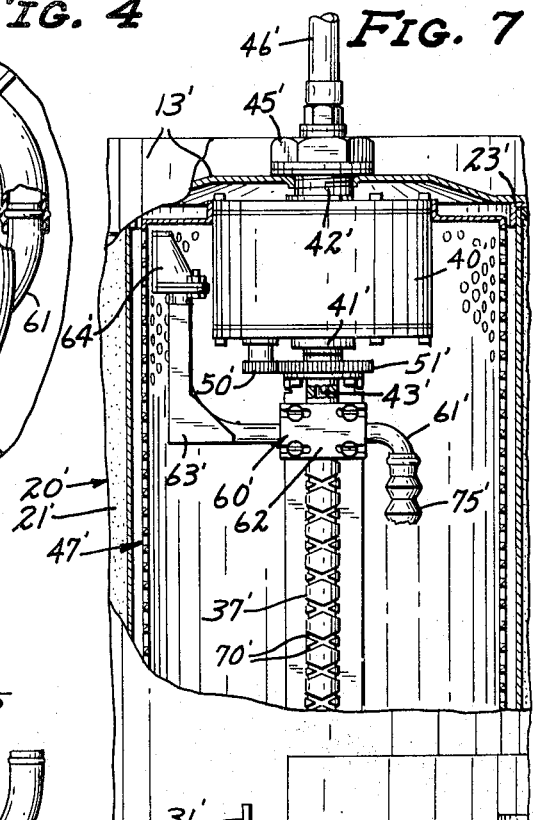
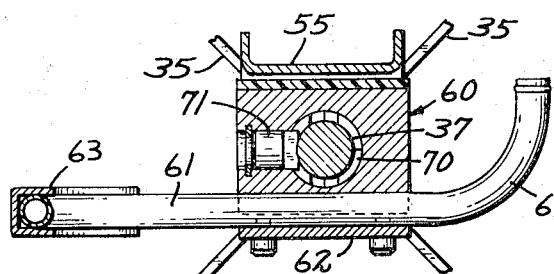
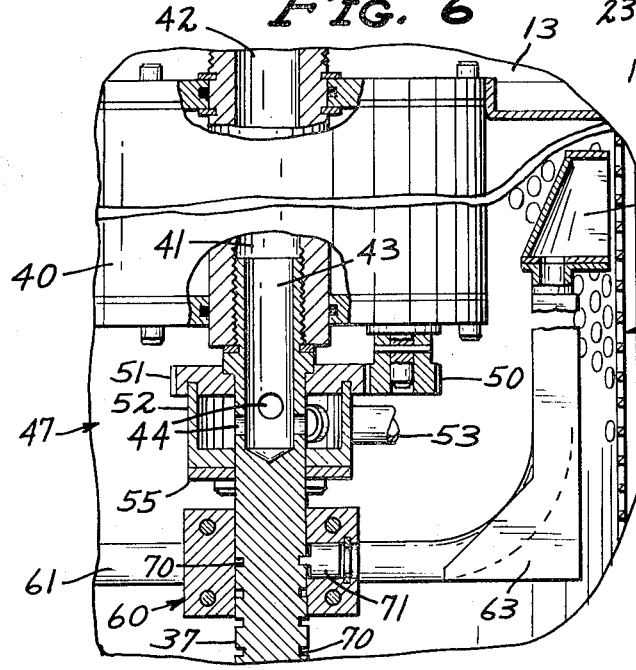

United States Patent Office 3,568,414
Patented Mar. 9, 1971

3,568,414
CLEANING APPARATUS FOR FLUID FILTERS
John R. Spriggs, Minneapolis, and Bernard A. Matthys, Rosemount, Minn., assignors to Donaldson Company, Inc., Minneapolis, Minn.
Filed June 5, 1969, Ser. No. 830,683
Int. Cl. B01d 46/04
U.S. Cl. 55—294                5 Claims

ABSTRACT OF THE DISCLOSURE

An elongated shaft adapted to be approximately coaxially mounted within a generally tubular, permeable fluid filter element, said shaft having right and left-hand helical channels formed therein and joined at the ends with guide means engaged therein for axial reciprocal movements along said shaft upon being rotated around said shaft, a fluid motor for rotating said guide means, a nozzle affixed to said guide means for directing a jet of fluid in a reverse direction through said fluid filter and flexible conduit means connecting said nozzle to a source of fluid whereby a jet of fluid is moved in a helical path around the inner surface of the filter element.

BACKGROUND OF THE INVENTION

Field of the invention

In general, the efficiency as well as the fluid-conducting ability of fluid permeable filter elements decreases as foreign material removed from the fluid collects in the filter element. Eventually the filter element will become obstructed with foreign material to an extent that it must be removed and cleaned or replaced. To increase the life and the operating efficiency of permeable filter elements it is presently the practice to place self-cleaning apparatus within the filter to periodically clean the filter element.

Description of the prior art

Prior art self-cleaning apparatus for fluid permeable filters in general, constitute a nozzle having an elongated opening therein, equal to all or a substantial portion of the axial length of the filter element, said nozzle being mounted for rotating movement within the filter element. In general, these types of self-cleaning apparatus are undesirable because the large nozzle openings require a relatively large device as a source of cleaning fluid to maintain the required pressure at the nozzle opening.

In a second type of self-cleaning apparatus, a nozzle is formed from two concentric tubular elements mounted for orbital movement adjacent the inner surface of a permeable filter element and having a pressurized fluid flowing therein. One of the tubular elements has a slot therethrough extending axially the length of the filter element and the other of the tubular elements has a generally helical slot extending therethrough. The outer tubular element rotates relative to the inner tubular element so that an opening is formed at the point where the two slots cross, which opening is directed toward the filter element and sweeps axially along the filter element. The combination of the axial movement of the opening and the orbital movement of the tubular elements provides a helical sweep of the filter element. This type of filter element is relatively undesirable because it is extremely difficult to obtain a high pressure on the cleaning fluid because of leaking between the various rotating parts. Further, the parts must be constructed with a relatively close tolerance or the entire device will not operate correctly.

SUMMARY OF THE INVENTION

The present invention pertains to cleaning apparatus for generally tubular-shaped, permeable fluid filters and the like wherein a nozzle is mounted within the permeable filter so as to direct a jet of fluid in a generally reverse direction through the fluid filter and means for causing said nozzle to follow a generally helical path relative to the fluid filter are provided.

It is an object of the present invention to provide an improved cleaning apparatus for generally tubular-shaped, permeable fluid filter elements and the like.

It is a further object of the present invention to provide cleaning apparatus having a nozzle which directs a jet of fluid in a reverse direction through a filter element and follows generally helical paths during the cleaning action.

It is a further object of the present invention to provide cleaning apparatus which can withstand relatively high pressures with little or no leakage of the various parts therein.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 4 is an enlarged sectional view as seen from line 4—4 in FIG. 1, portions thereof broken away;

FIG. 5 is an enlarged sectional view as seen from the line 5—5 in FIG. 1, portions thereof broken away;

FIG. 6 is an enlarged sectional view as seen generally from line 6—6 in FIG. 3, portions thereof broken away; and FIG. 7 is a view similar to FIG. 1 of a modified embodiment.

DESCRIPTION OF THE PREFERRED EMBODIMENTS

Figure 1:
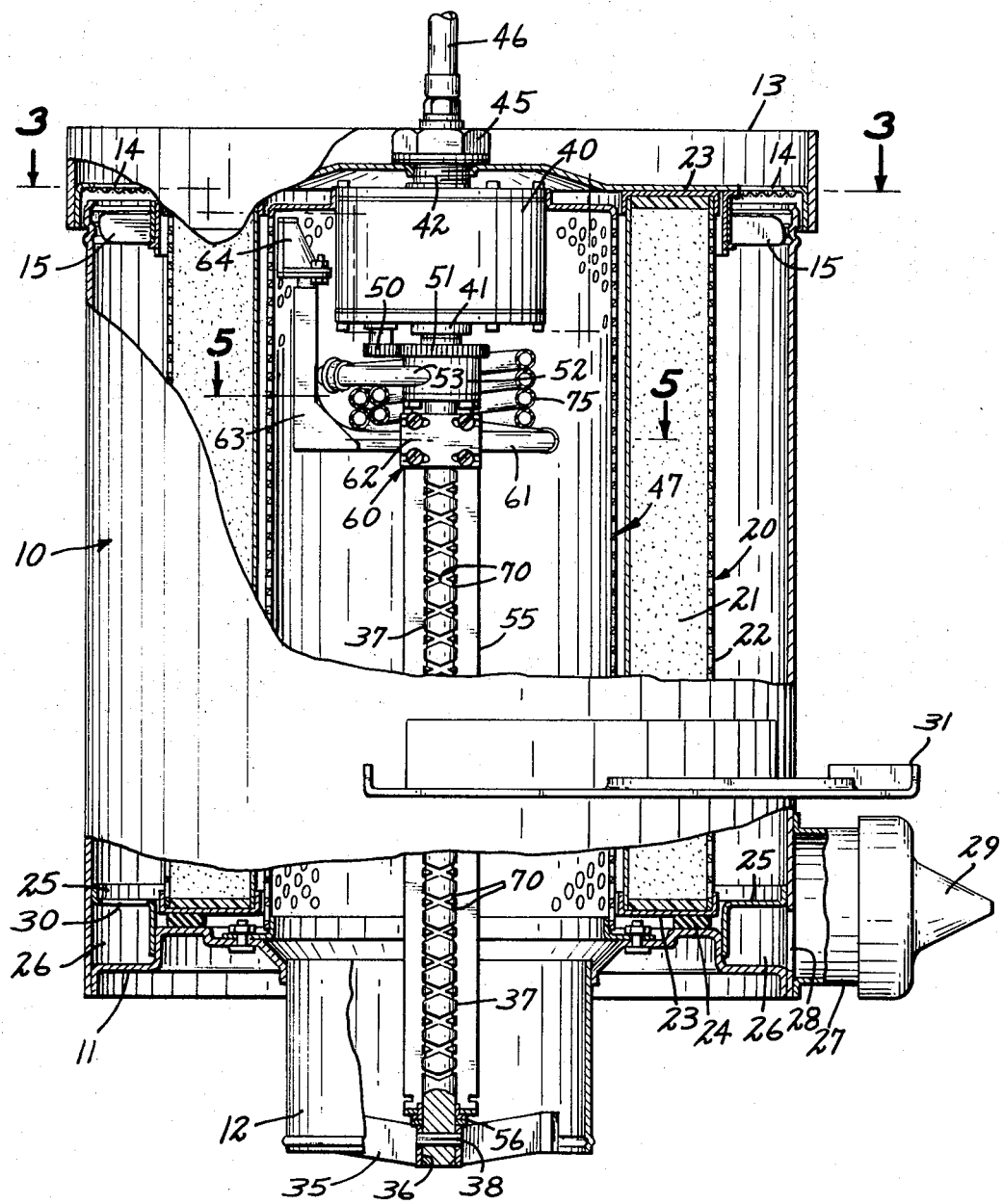
FIG. 1 is a view in side elevation of a fluid filter having the present cleaning apparatus mounted therein, portions thereof broken away and shown in section.
Figure 2:
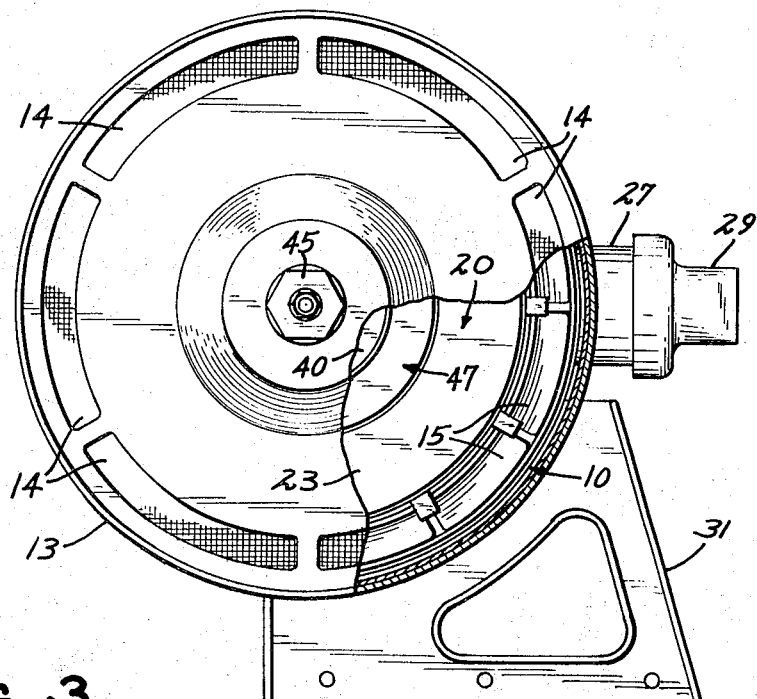
FIG. 2 is a view in top plan of the apparatus illustrated in FIG. 1, somewhat diminished in size, with portions thereof broken away and shown in section.
Figure 3:
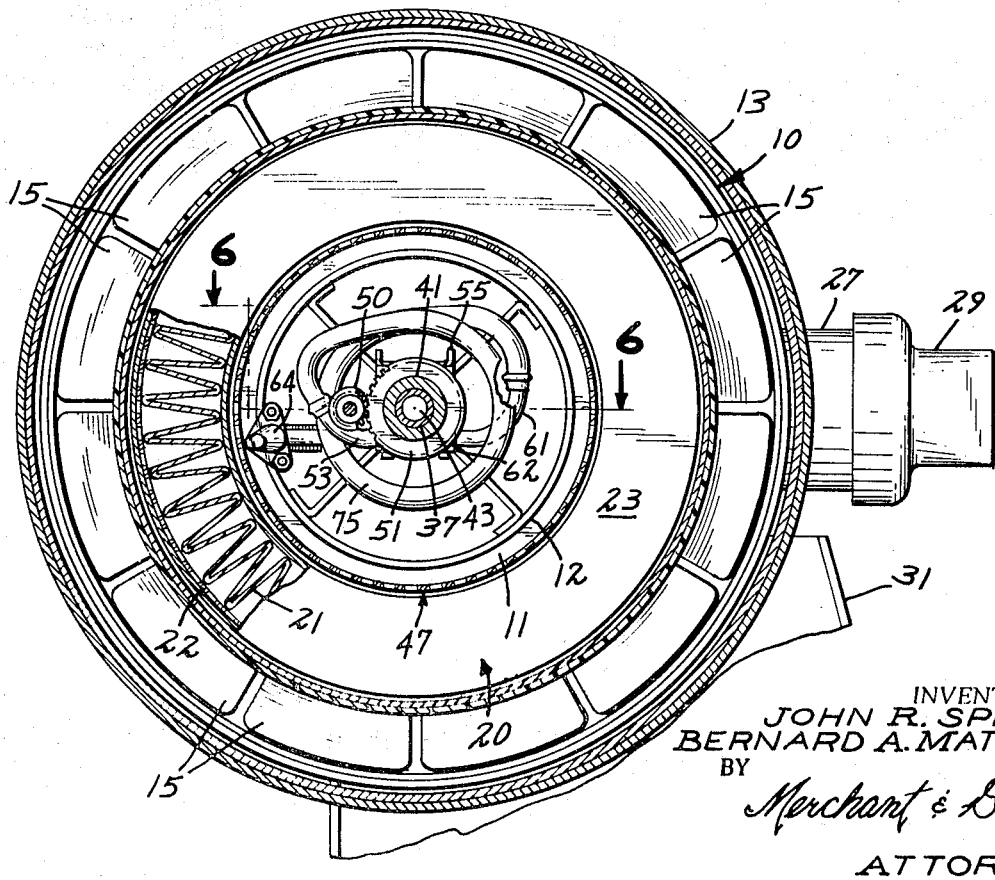
FIG. 3 is a sectional view as seen from the line 3—3 in FIG. 1, portions thereof broken away.

Referring to the figures, a generally tubular housing 10 has a plate 11 affixed in one end thereof, by welding or the like, with an outlet conduit 12 coaxially affixed in a central opening thereof. The outlet conduit 12 has a bead around the outwardly directed end thereof and is adapted to receive thereover a flexible conduit or the like for the further conduction of filtered fluid to a point at which it is to be used. The opposite end of the housing 10 has a cover 13 removably positioned thereover. The cover 13 has a plurality of openings 14 therethrough, which form the inlet for the filter and are covered by screen to initially remove coarse foreign particles. A plurality of vanes 15 are mounted in radially extending positions immediately beneath the openings 14 in the cover 13 to direct fluid entering the openings 14 in a generally helical path toward the other end of the housing 10. The helical or swirling movement of the fluid through the housing 10 causes large foreign particles to be separated from the fluid by centrifugal force, which large particles move toward the plate 11 at the opposite end of the housing 10. It should be understood that the present housing 10, including the inlets and outlets therefor, is illustrated for exemplary purposes and many types and varieties of housings and filters may be utilized by those skilled in the art.

A generally tubular fluid permeable filter element 20, which in this embodiment is formed of folded or corrugated fluid-permeable paper 21, held in position by means of a screen 22 therearound and annular caps 23 at both ends thereof, is positioned coaxially within the housing 10 so that one cap 23 is adjacent the cover 13 and the other cap 23 is sealingly engaged against a flexible annular seal 24, which rests on the inner surface of the plate 11. The seal 24 may be permanently affixed to the plate 11 or may be affixed to the cap 23 so that a new seal 24 is inserted each time a new filter element 20 is inserted. Fluid entering the openings 14 in the cover 13 and swirling toward the plate 11 under the influence of the vanes 15, eventually passes through the screen 22 and permeable paper 21 of the filter element 20, after which the filtered fluid passes through the outlet conduit 12. As the fluid passes through the filter element 20, foreign particles will be removed therefrom and many of these particles adhere to the outer surface of the filter element 20.

A ring 25 is affixed between the plate 11 and the housing 10 to form an annular chamber 26 generally adjacent the end of the filter element 20 opposite the inlet openings 14. A foreign particle outlet is formed by means of a conduit 27 affixed to the outer surface of the housing 10 and communicating with the annular chamber 26 through an opening 28 in the housing 10. The outwardly directed end of the conduit 27 has a dust cup 29 engaged thereover for periodically releasing foreign particles collected therein into the atmosphere, a container, etc. The annular chamber 26 communicates with the area between the housing 10 and the screen 22 of the filter element 20 through an opening 30 positioned diametrically opposite the opening 28. The annular chamber 26 is formed so that the fluid swirling within the housing 10 under the influence of the vanes 15 will eventually cause larger foreign particles to pass through the opening 30 into the annular chamber 26. Because the annular chamber 26 is separated from the remainder of the filter except for the opening 30, the foreign particles will not be reentrained with the fluid but will pass into the conduit 27 and dust cup 29. A bracket 31 is affixed to the housing 10 for mounting the filter in the desired orientation and in general the orientation will depend upon requirements and components of the filter and apparatus upon which it is mounted.

A spider 35 is fixedly engaged adjacent the outlet end of the outlet conduit 12 so that a central opening 36 therein is generally coaxial with the outlet conduit 12 and the housing 10. The opening 36 has an elongated shaft 37 fixedly engaged therein by means of a pin 38 so that the shaft 37 extends axially a substantial distance into the housing 10. A fluid motor 40 having an outlet 41 and an inlet 42 on opposite sides thereof has the free end of the shaft 37 fixedly engaged in the outlet 41. The free end of the shaft 37 has a coaxial opening 43 extending partially into the shaft 37 with a plurality of radially outwardly extending openings 44 providing an outlet for fluid from the motor 40 (see FIG. 6). The inlet 42 of the motor 40 has an externally threaded conduit affixed therein, which extends through an opening in the cover 13, and a nut 45 is threadedly engaged over the conduit to maintain the cover 13 fixedly in position. An external conduit 46, which is attached to a supply of fluid under pressure (not shown), is affixed to the conduit in the inlet 42 of the motor 40. A tubular screen 47 is rigidly affixed to the plate 11 at one end thereof and extends coaxial with the filter element 20 approximately the length thereof. The free end of the screen 47 is turned radially inwardly and engages the fluid motor 40 to provide support for the fluid motor 40 and the upper end of the shaft 37.

The fluid motor 40 has an output drive gear 50 on a shaft extending generally parallel with the shaft 37. A gear 51 journaled on the shaft 37 between the motor 40 and the openings 44 in the shaft 37, meshes with the drive gear 50 and is driven thereby. The gear 51 has a generally cylindrical housing 52 affixed thereto so as to encircle the openings 44. The housing 52 is constructed to rotate relative to the shaft 37 with the gear 51, while substantially containing fluid egressing through the openings 44 from the motor 40. The housing 52 has a short piece of conduit 53 extending outwardly therethrough, for purposes which will be explained presently.

An elongated guide plate 55 is positioned in parallel spaced-apart relationship adjacent the shaft 37 with one end thereof affixed to the underside of the housing 52 and the other end thereof affixed to a bearing 56, which is engaged over the shaft 37 adjacent the spider 35. The guide plate 55 orbits about the shaft 37 as the housing 52 is rotated through the gear 51 and drive gear 50. The surface of the guide plate 55 adjacent the shaft 37 is generally flat and always parallel with but spaced from a tangent to the shaft 37. The longitudinal edges of the guide plate 55 are turned outwardly to provide the guide plate 55 with sufficient strength to prevent undue transverse movement thereof.

A guide block 60 has an opening therethrough with an inner diameter slightly larger than the outer diameter of the shaft 37. The guide block 60 is engaged over the shaft 37 so that one side thereof is in sliding engagement with the inner surface of the guide plate 55. Because the guide block 60 is free to rotate on the shaft 37 and one surface thereof engages the guide plate 55, rotation of the guide plate 55 produces rotation of the guide block 60. The side of the guide block 60 opposite the guide plate 55 has a groove therein extending generally perpendicular to the shaft 37. An elongated piece of rigid conduit 61 is fixedly engaged in the groove in the guide block 60 by means of a plate 62, which is fixedly attached to the side of the guide block 60 over the conduit 61 by means of screws or the like. The conduit 61 extends outwardly from one side of the guide block 60 and is bent in a 90° arc so that a portion adjacent the end is generally parallel with and adjacent the inner surface of the screen 47. A piece of sheet metal or the like, designated 63 is formed into a trough or channel and engaged around the conduit 61 at the 90° bend therein to strengthen the conduit 61 and prevent additional bending thereof. A member 64 is affixed to the end of the conduit 61 and forms an elongated orifice extending generally parallel with the axes of the screen 47 and filter element 20 and directed generally radially outwardly. The member 64 forms fluid from the conduit 61 into a jet directed generally in a reverse direction through the filter element 20. The nozzle formed by member 64 and conduit 61 is positioned so that the jet of fluid formed thereby passes through the end of the filter element 20 adjacent the cover 13 when the guide block 60 is adjacent the housing 52 and through the end of the filter element 20 adjacent the plate 11 when the guide block 60 is adjacent the bearing 56 and spider 35.

The shaft 37 has a left and a right helical channel 70 in the outer periphery thereof, each of which extend from adjacent the mounting bearing 56 at one end thereof to adjacent the housing 52 at the other end thereof. The left and right helical channels 70 are joined at each end to provide a continuous path. A follower member 71 is affixed in an opening in the guide block 60 (see FIGS. 5 and 6) so that an inner arcuate edge thereof is engaged in one of the helical channels 70. The follower member 71 remains engaged in one of the helical channels 70 as the guide block 60 is rotated and moves the guide block 60 axially along the shaft 37. Because the helical channels 70 are joined at each end, continuous rotation of the guide plate 55 and guide block 60 causes reciprocatory movement of the guide block 60 between the bearing 56 and the housing 52. As the guide block 60 rotates about the shaft 37 and reciprocates axially thereon, the member 64 traces generally helical paths on the inner surface of the screen 47.

The open end of the conduit 61 communicates with the conduit 53 of the housing 52 through a flexible conduit 75. The flexible conduit 75 is looped around the shaft 37 and the guide plate 55 several times so that movement of the guide block 60 from one extreme to the other produces substantially no strains on the flexible conduit 75. Further, since there is no relative rotation between the housing 52 and the guide block 60 the relative axial movement therebetween only causes a spring-like extension and compression of the flexible conduit 75. Thus, fluid entering the conduit 46 to drive the fluid motor 40 passes into the housing 52 and through the flexible conduit 75 to the nozzle where the member 64 directs it through the filter element 20 in a reverse direction. As foreign particles are removed from the filter element 20 by the jet of fluid from the member 64, the particles are carried into the annular chamber 26 by the swirling fluid entering the openings 14.

In FIG. 7 a modified embodiment is illustrated wherein the various parts are designated with numerals having a prime added to indicate a modified embodiment and parts similar to the parts described in the first embodiment are designated with similar numerals. The modified embodiment of FIG. 7 has a fluid motor 40' with one end of a shaft 37' affixed thereto and the opposite end mounted by a spider 35', as in the previously-described embodiment. A guide plate 55', guide block 60', conduit 61' and orifice-forming member 64' are all mounted and constructed as in the previously-described embodiment. The modified embodiment differs from the previously-described embodiment in that the shaft 37' is hollow from the end attached to the motor 40' to adjacent the opposite end thereof and a housing 52' is rotatably mounted on the shaft 37' at the end adjacent the spider 35'. A flexible conduit 75', which is constructed generally like a bellows for collapsing and extending motions, is connected between a conduit 53' extending into the housing 52' and the conduit 61' to provide communication between the fluid flowing in the shaft 37' from the motor 40' to the conduit 61'. It should be noted that the housing 52' might be mounted similar to the housing 52 and the modified embodiment would operate. Other modifications and alterations will occur to those skilled in the art and it should be understood that the embodiments illustrated are for exemplary purposes.

Thus, cleaning apparatus for permeable fluid filters and the like is illustrated, which cleaning apparatus provides a jet of fluid flowing in a reverse direction through the permeable fluid filter and traveling in substantially helical paths about the fluid filter to remove foreign particles therefrom. Because the nozzle, conduits, etc. conveying and directing the jet of fluid onto the filter element have relatively few moving parts, there is little or no fluid leakage from the cleaning apparatus and relatively high pressures can be utilized and maintained. It should of course be understood that may modifications and alterations of the shaft and guide mechanism might be devised by those skilled in the art and the present embodiments are only exemplary.

What is claimed is:

1. Self-cleaning permeable fluid filter apparatus comprising:
   (a) a hollow housing having a fluid inlet and a fluid outlet;
   (b) a generally tubular-shaped, fluid permeable filter;
   (c) mounting means fixedly positioning said filter within said housing so that fluid flowing from the inlet to the outlet of said housing passes through said filter;
   (d) an elongated shaft having at least one helical channel in a surface thereof extending axially substantially the length therealong mounted in said housing generally coaxially within said filter;
   (e) guide means mounted within said housing, said guide means being mounted for generally coaxial rotation on said shaft;
   (f) motor means affixed to said housing and said guide means for producing rotation of said guide means;
   (g) nozzle means positioned coaxially within said filter for directing a jet of fluid through said permeable filter in a direction generally the reverse of a normal flow of fluid through said permeable filter from the inlet to the outlet of said housing;
   (h) follower means attached to said guide means and having said nozzle means attached thereto and engaged in said helical channel and guided by and rotated by said guide means for moving said nozzle means along said helical channel so that the jet of fluid follows a generally helical path on the fluid filter during rotation of said guide means; and
   (i) connecting conduit means providing communication between said nozzle and a supply of fluid.

2. Cleaning apparatus as set forth in claim 1 wherein the connecting means includes flexible conduit means connected between the nozzle means and axially fixed, rotatable fluid coupling means affixed to the guide means for rotation therewith.

3. Cleaning apparatus as set forth in claim 1 wherein the shaft has a right and lefthand helical channel formed therein, said channels being joined at the ends for providing continuous axial, reciprocatory movement of the nozzle means.

4. Cleaning apparatus as set forth in claim 1 wherein the motor means includes a fluid-operated motor.

5. Cleaning apparatus as set forth in claim 4 wherein the fluid motor has an outlet for said fluid which outlet serves as a supply of fluid for the nozzle.

References Cited
UNITED STATES PATENTS

| | | | |
|---|---|---|---|
| 407,948 | 7/1889 | Case | 55—432 |
| 2,586,014 | 2/1952 | Dunphy | 15—312 |
| 2,591,198 | 4/1952 | Ringe | 55—294 |
| 2,676,352 | 4/1954 | Moore | 15—312 |
| 2,796,146 | 6/1957 | Hersey, Jr. et al. | 55—294 |
| 2,835,390 | 5/1958 | King | 210—414 |
| 3,325,978 | 6/1967 | Rymer et al. | 55—294 |
| 3,362,642 | 1/1968 | Freeman et al. | 239—227 |
| 3,429,108 | 2/1969 | Larson | 55—337 |

FRANK W. LUTTER, Primary Examiner

B. NOZICK, Assistant Examiner

U.S. Cl. X.R.

55—337, 432; 239—227